(12) United States Patent
Noll et al.

(10) Patent No.: US 11,172,614 B2
(45) Date of Patent: Nov. 16, 2021

(54) AUTOMATIC HEADER LATCH

(71) Applicant: CNH Industrial America LLC, New Holland, PA (US)

(72) Inventors: Blaine R. Noll, Fleetwood, PA (US); Benjamin Kemmerer, Hamburg, PA (US); Preston L. McKinney, Rebersburg, PA (US)

(73) Assignee: CNH Industrial America LLC, New Hollnd, PA (US)

( * ) Notice: Subject to any disclaimer, the term of this patent is extended or adjusted under 35 U.S.C. 154(b) by 81 days.

(21) Appl. No.: 16/534,602

(22) Filed: Aug. 7, 2019

(65) Prior Publication Data

US 2021/0037710 A1    Feb. 11, 2021

(51) Int. Cl.
| | |
|---|---|
| *A01D 41/16* | (2006.01) |
| *A01B 59/00* | (2006.01) |
| *A01B 59/06* | (2006.01) |
| *A01D 41/14* | (2006.01) |
| *A01D 45/02* | (2006.01) |
| *A01D 67/00* | (2006.01) |
| *B60D 1/04* | (2006.01) |

(52) U.S. Cl.
CPC ............ *A01D 41/16* (2013.01); *A01B 59/006* (2013.01); *A01B 59/062* (2013.01); *A01B 59/064* (2013.01); *A01D 41/145* (2013.01); *A01D 45/028* (2013.01); *A01D 67/005* (2013.01); *B60D 1/04* (2013.01)

(58) Field of Classification Search
CPC .... A01D 41/16; A01D 67/005; A01D 45/028; A01D 41/145; A01B 59/064; A01B 59/006; A01B 59/062; B60D 1/04
See application file for complete search history.

(56) References Cited

U.S. PATENT DOCUMENTS

| | | | |
|---|---|---|---|
| 3,172,686 A * | 3/1965 | Beard ................ | A01B 59/062 172/272 |
| 3,324,635 A | 6/1967 | Ashton et al. | |
| 3,324,637 A * | 6/1967 | Windsor ............... | A01D 41/16 56/15.6 |
| 3,431,711 A * | 3/1969 | Claas .................... | A01D 41/12 56/15.6 |

(Continued)

FOREIGN PATENT DOCUMENTS

| | | | | |
|---|---|---|---|---|
| CN | 205266258 U | * | 6/2016 | ............ A01D 41/12 |
| GB | 1206648 A | | 9/1970 | |

(Continued)

OTHER PUBLICATIONS

Extended European Search Report for EP Application No. 20189927.5 dated Jan. 11, 2021 (six pages).

*Primary Examiner* — Arpad Fabian-Kovacs
(74) *Attorney, Agent, or Firm* — Peter Zacharias; Patrick Sheldrake (57) ABSTRACT

An attachment system for an agricultural vehicle including a feeder housing and a header. The attachment system includes at least one feeder connecting member configured for being located on and movably connected to the feeder housing, and at least one header connecting member configured for being located on the header. The at least one feeder connecting member is automatically connectable and securable to the at least one header connecting member as the feeder housing lifts the header.

8 Claims, 8 Drawing Sheets

(56) References Cited

U.S. PATENT DOCUMENTS

| | | | |
|---|---|---|---|
| 3,488,930 A | 1/1970 | Gorsler et al. | |
| 4,019,753 A * | 4/1977 | Kestel | A01B 59/062 172/448 |
| 4,253,295 A | 3/1981 | Knepper | |
| 4,280,317 A | 7/1981 | Lindblom et al. | |
| 4,415,175 A * | 11/1983 | Kainer | A01B 59/062 172/272 |
| 4,444,000 A * | 4/1984 | Enzmann | A01D 41/16 56/14.6 |
| 4,549,744 A * | 10/1985 | Herr | A01B 59/062 172/272 |
| 4,568,098 A * | 2/1986 | Landry, Jr. | B60D 1/07 280/416.1 |
| 5,029,650 A * | 7/1991 | Smit | A01B 59/062 172/5 |
| 6,349,959 B2 * | 2/2002 | Schlegel | A01B 59/006 116/284 |
| 6,619,020 B1 * | 9/2003 | Chaney | A01D 41/142 56/10.9 |
| 7,404,448 B2 * | 7/2008 | Tuttle | B60D 1/04 172/439 |
| 7,530,405 B2 * | 5/2009 | Kollath | A01B 59/006 172/272 |
| 9,137,946 B2 | 9/2015 | Verhaeghe et al. | |
| 9,736,976 B2 * | 8/2017 | Figger | A01B 59/006 |
| 9,795,084 B2 | 10/2017 | Carpenedo | |
| 2003/0172637 A1 * | 9/2003 | Watts | A01D 41/16 56/14.7 |
| 2005/0012305 A1 * | 1/2005 | Wood, Jr. | A01B 59/062 280/508 |
| 2006/0055140 A1 * | 3/2006 | Trefz | A01B 71/063 280/100 |
| 2016/0057930 A1 * | 3/2016 | Ritter | A01D 41/16 56/15.6 |
| 2016/0057934 A1 * | 3/2016 | Dreer | A01D 69/03 56/13.5 |
| 2016/0128261 A1 | 5/2016 | Figger | |
| 2018/0255707 A1 * | 9/2018 | Walter | E02F 3/3663 |

FOREIGN PATENT DOCUMENTS

| | | |
|---|---|---|
| WO | 2011161143 A1 | 12/2011 |
| WO | 2014173617 A1 | 10/2014 |

\* cited by examiner

AUTOMATIC HEADER LATCH

BACKGROUND OF THE INVENTION

The present invention pertains to an agricultural vehicle and, more specifically, to an automatic latch between a header and the agricultural vehicle.

An agricultural harvester known as a "combine" is historically termed such because it combines multiple harvesting functions with a single harvesting unit, such as picking, threshing, separating, and cleaning. A combine includes a header which removes the crop from a field and a feeder housing which transports the crop material into a threshing rotor. The threshing rotor rotates within a perforated housing, which may be in the form of adjustable concaves, and performs a threshing operation on the crop to remove the grain. The threshing rotor is provided with rasp bars that interact with the crop material in order to further separate the grain from the crop material, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

The header is typically removably attached to the feeder housing of the combine. The coupling process to connect the header to the feeder housing typically includes multiple steps, which most generally require manual intervention. An operator must generally position the header in the field. Then, the operator drives the combine toward the header and positions the feeder housing in line with a corresponding outlet opening in the back wall of the header. The feeder housing may be initially connected to the header, and the feeder housing may be lifted up until the header rests against the front surface of the feeder housing. Then, the operator needs to manually latch the header to the feeder housing. For example, the operator may manually rotate a hook on the feeder housing until it engages with a bar on the header. Once the header is locked onto the feeder housing, the operator may manually connect the electrical lines, hydraulic coupling, and drive shaft of the header to the drive shaft of the combine. As can be appreciated, such manual operations increase the difficulty and time involved in connecting the header to the feeder housing.

What is needed in the art is a cost-effective coupling device for efficiently connecting the header to the feeder housing.

SUMMARY OF THE INVENTION

In one exemplary embodiment formed in accordance with the present invention, there is provided an automatic attachment system that includes at least one feeder connecting member and at least one header connecting member. The at least one feeder connecting member automatically engaged with the at least one header connecting member upon the feeder housing lifting the header.

In another exemplary embodiment formed in accordance with the present invention, there is provided an attachment system for an agricultural vehicle including a feeder housing and a header. The attachment system includes at least one feeder connecting member configured for being located on and movably connected to the feeder housing, and at least one header connecting member configured for being located on the header. The at least one feeder connecting member is automatically connectable and securable to the at least one header connecting member as the feeder housing lifts the header.

In yet another exemplary embodiment formed in accordance with the present invention, there is provided an agricultural vehicle that includes a chassis, a feeder housing connected to the chassis, a header removably connected to the feeder housing, and an attachment system for automatically attaching and securing the header to the feeder housing as the header is lifted by the feeder housing. The attachment system includes at least one feeder connecting member located on and movably connected to the feeder housing, and at least one header connecting member located on the header. The at least one feeder connecting member is automatically connectable and securable to the at least one header connecting member as the feeder housing lifts the header.

In yet another exemplary embodiment formed in accordance with the present invention, there is provided a method for attaching a header to a feeder housing of an agricultural vehicle. The method includes an initial step of providing an attachment system for the agricultural vehicle. The attachment system includes at least one feeder connecting member configured for being located on and movably connected to the feeder housing, and at least one header connecting member configured for being located on the header. The method includes the further step of lifting the header, by the feeder housing, for automatically connecting and securing the at least one feeder connecting member to the at least one header connecting member as the feeder housing lifts the header. Wherein, at least one of a shape of the at least one header connecting member and a weight of the header automatically causes the at least one feeder connecting member to lock with the at least one header connecting member for securing the header to the feeder housing.

One possible advantage of the exemplary embodiment of the agricultural vehicle is that the operator does not need to manually connect the header to the feeder housing.

Another possible advantage of the exemplary embodiment of the agricultural vehicle is that the process of connecting the header to the feeder housing is made more efficient by way of the feeder connecting member automatically connected to the header connecting member upon the feeder housing lifting the header.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the header and/or components thereof are usually determined with reference to the direction of forward operative travel of the header, but again, they should not be construed as limiting.

Figure 1:
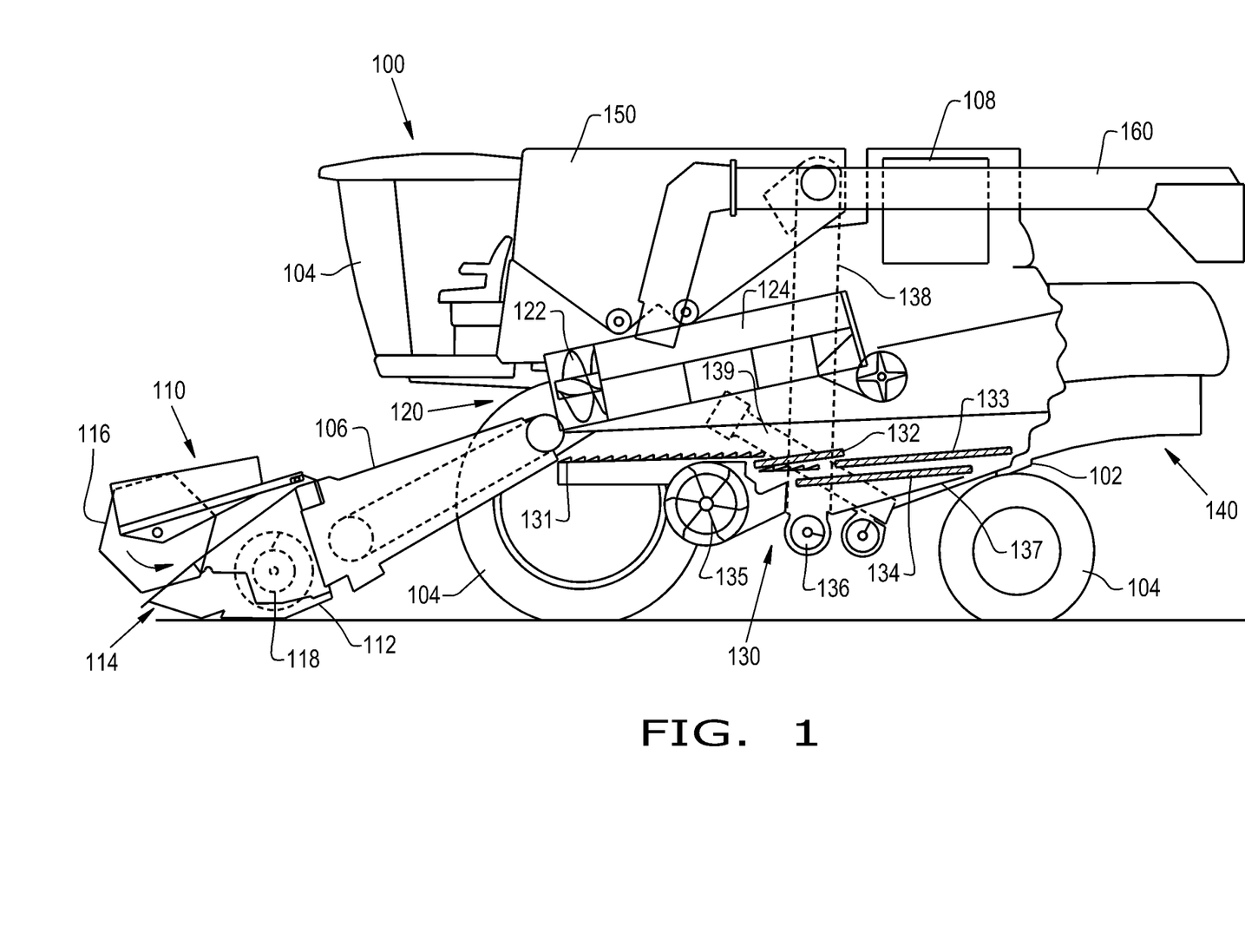
FIG. 1 illustrates a side view of an exemplary embodiment of an agricultural vehicle including a header, in accordance with an exemplary embodiment of the present invention.

Referring now to the drawings, and more particularly to FIG. 1, there is shown an exemplary embodiment of an agricultural vehicle 100 in the form of a combine 100. However, the agricultural vehicle 100 may be in the form of any desired agricultural vehicle 100, such as a windrower. The agricultural vehicle 100 generally includes a chassis 102, ground engaging wheels and/or tracks 104, a feeder housing 106, and a prime mover 108. The combine 100 may also include a header 110, a separating system 120, a cleaning system 130, a discharge system 140, an onboard grain tank 150, and an unloading auger 160.

The threshing system 120 may be of the axial-flow type, and thereby may include an axially displaced threshing rotor 122 which is at least partially enclosed by a rotor housing 124. The rotor housing 124 can include a rotor cage and perforated concaves. The cut crop is threshed and separated by the rotation of rotor 122 within the rotor housing 124 such that larger elements, for example stalks, leaves, and other MOG is discharged out of the rear of agricultural vehicle 100 through the discharge system 140. Smaller elements of crop material, such as grain and non-grain crop material, including particles lighter than grain, such as chaff, dust and straw, may pass through the perforations in the concaves and onto the cleaning system 130.

The cleaning system 130 may include a grain pan 131, a sieve assembly which can include an optional pre-cleaning sieve 132, an upper sieve 133 (also known as a chaffer sieve), a lower sieve 134 (also known as a cleaning sieve), and a cleaning fan 135. The grain pan 131 and pre-cleaning sieve 132 may oscillate in a fore-to-aft manner to transport the grain and finer non-grain crop material to the upper sieve 133. The upper sieve 133 and lower sieve 134 are vertically arranged relative to each other, and may also oscillate in a fore-to-aft manner to spread the grain across sieves 133, 134, while permitting the passage of clean grain, by gravity, through openings in the sieves 133, 134. The fan 135 may provide an airstream through the sieves 132, 133, 134 to blow non-grain material, such as chaff, dust, and other impurities, toward the rear of the agricultural vehicle 100.

The cleaning system 130 may also include a clean grain auger 136 positioned crosswise below and toward the front end of the sieves 133, 134. The clean grain auger 136 receives clean grain from each sieve 133, 134 and from a bottom pan 137 of the cleaning system 130. The clean grain auger 136 conveys the clean grain laterally to a generally vertically arranged grain elevator 138 for transport to the grain tank 150. The cleaning system 130 may additionally include one or more tailings return augers 139 for receiving tailings from the sieves 133, 134 and transporting these tailings to a location upstream of the cleaning system 130 for repeated threshing and/or cleaning action. Once the grain tank 150 becomes full, the clean grain therein may be transported by the unloading auger 160 into a service vehicle.

The header 110 is removably attached to the feeder housing 106. The header 110 generally includes a frame 112, a cutter bar 114 that severs the crop from a field, a rotatable reel 116 rotatably mounted to the frame 112, which feeds the cut crop into the header 110, and a conveyor 118, e.g. an auger 118 with flighting, that feeds the severed crop inwardly from each lateral end of the frame 112 toward feeder housing 106. The header 110 may be in the form of any desired header, such as a draper header, corn header, disc header, etc., for a combine 100 and/or windrower. As can be appreciated, the header 110 may be at least partially lifted or carried by the feeder housing 106, which typically includes an actuating system with one or more hydraulic cylinders.

Figure 2:
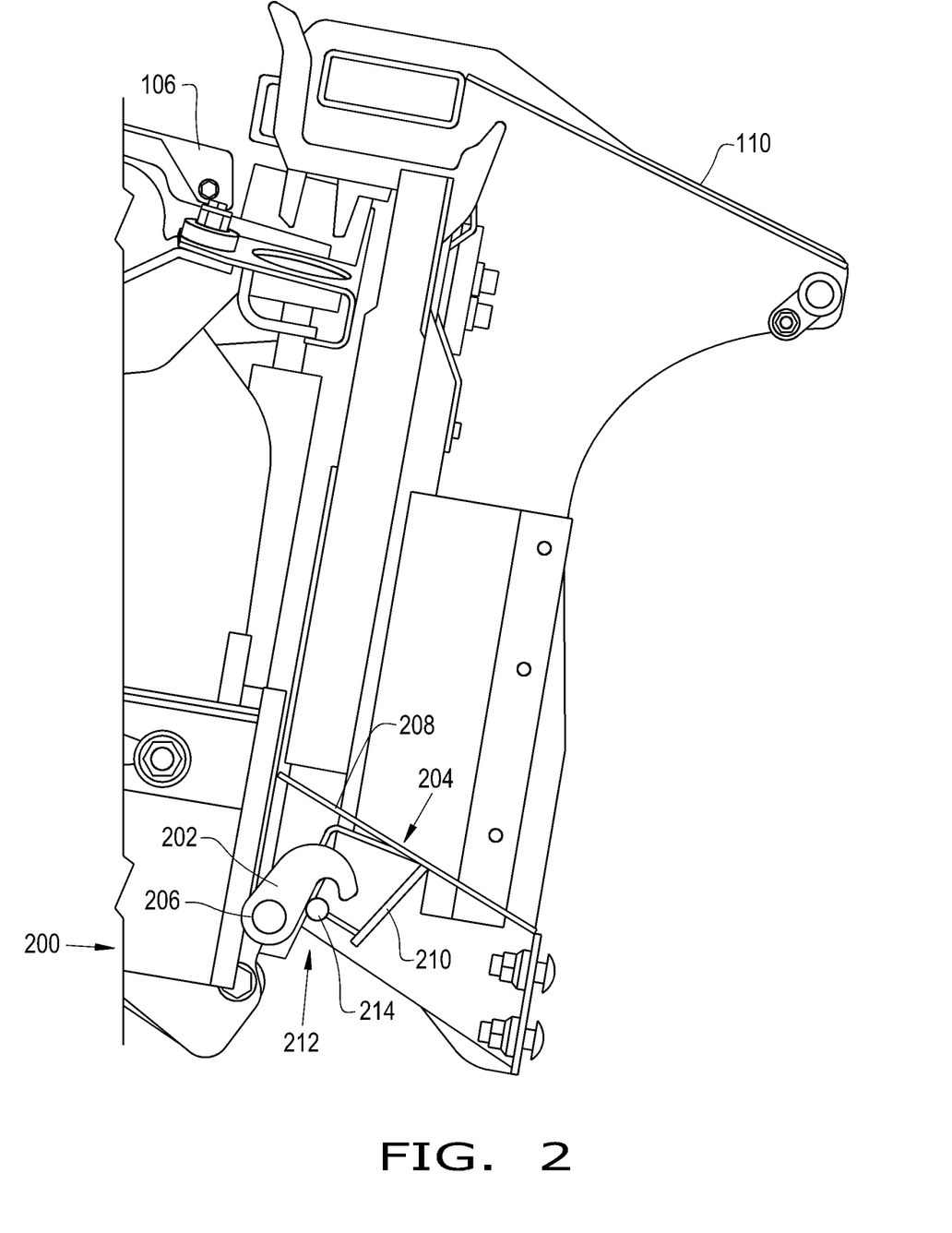
FIG. 2 illustrates a cross-sectional view of an automatic latch system in an initial, unlocked position before the header is picked up by the combine.
Figure 3:
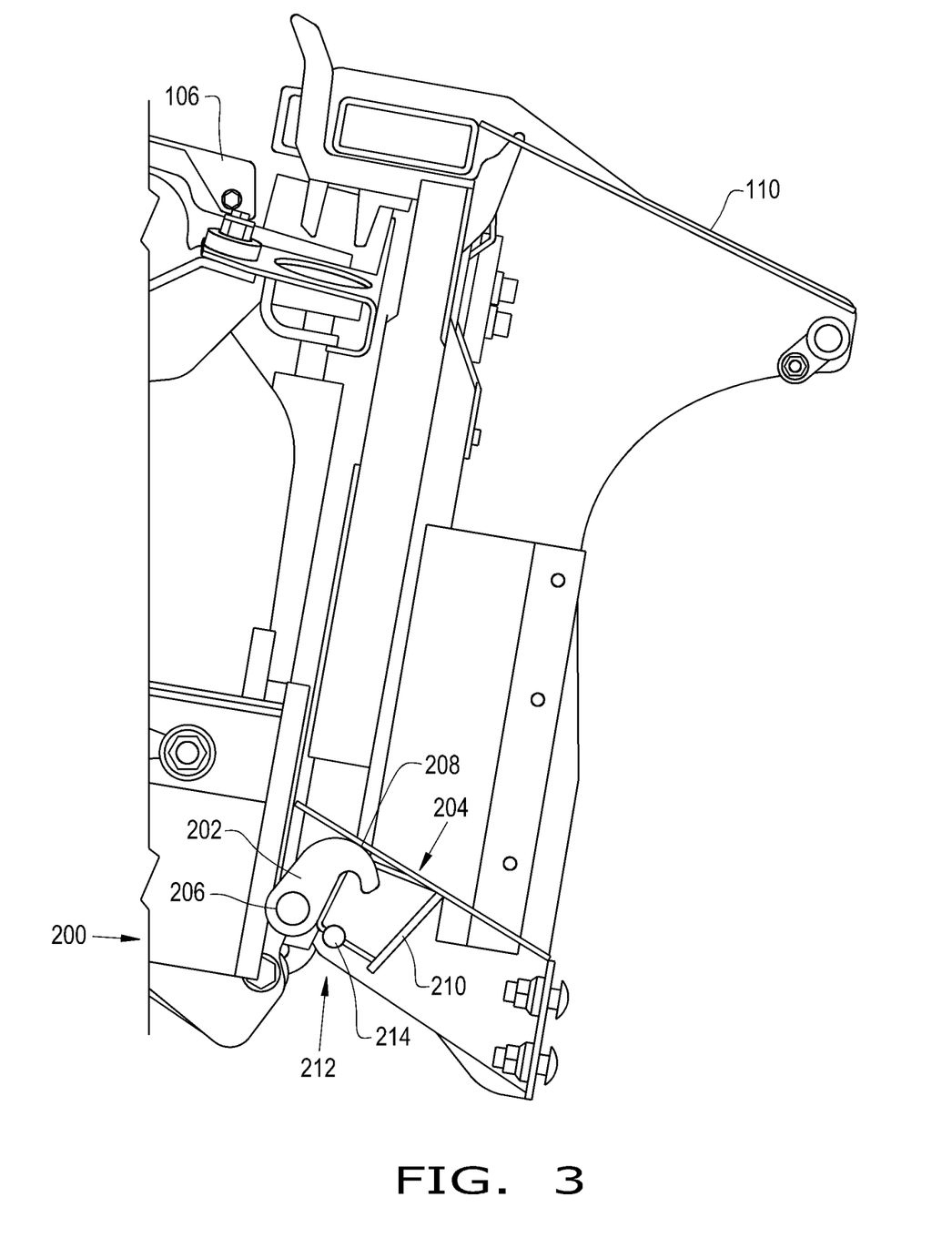
FIG. 3 illustrates a cross-sectional view of the automatic latch system in an intermediate position while the header is being picked up by the combine.
Figure 4:
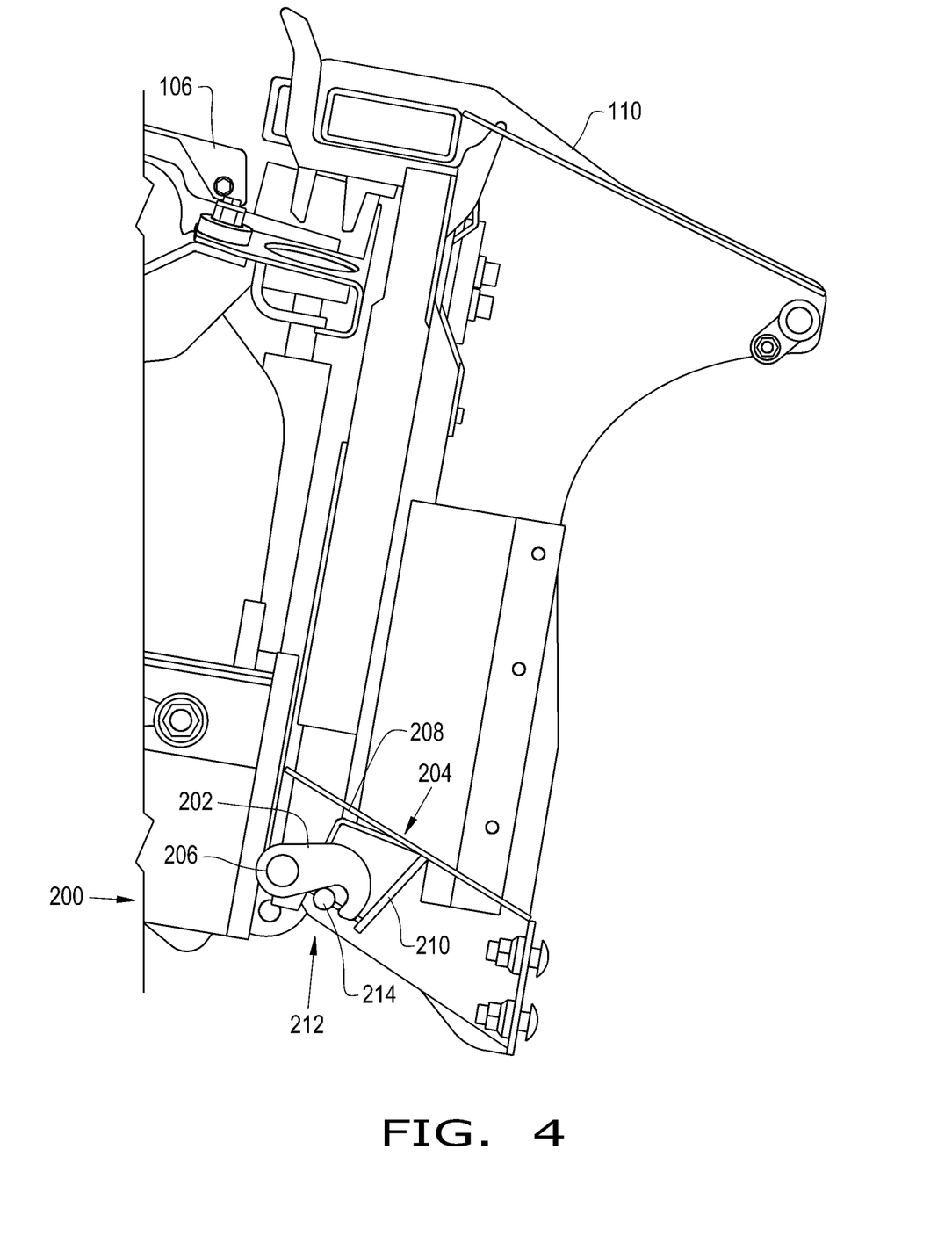
FIG. 4 illustrates a cross-sectional view of the automatic latch system in a locked position after the header has been picked up by the combine.

Referring now to FIGS. 2-4, there is shown an exemplary embodiment of an automatic attachment system 200 in the form of a latch system 200 for automatically connecting and locking the header 110 to the feeder housing 106. Hence, the latch system 200 eliminates the need for manual intervention when securing the header 110 to the feeder housing 106. The latch system 200 generally includes at least one feeder connecting member 202 located on and movably connected to the feeder housing 106 and at least one header connecting member 204, e.g. pocket 204, located on the header 110. As the agricultural vehicle 100 contacts and picks up the header 100, the latch system 200 may be accordingly positioned in an initial, unlocked position before the header 110 is picked up by the feeder housing 106 (FIG. 2), an intermediate position while the header 110 is being picked up by the feeder housing 106 (FIG. 3), and a locked position after the header 110 has been picked up by the feeder housing 106 (FIG. 4).

The at least one feeder connecting member 202 may be in the form of a pair of latching mechanisms, such as left and right hooks 202. Each hook 202 may be an elongated hook with a stem portion, a curved outer profile with a gradual gradient, a curved inner profile with a steep gradient, and an end hooked portion. However, the hooks 202 may have any desired shape and may comprise any desired material. It should be appreciated that each hook 202 may be shaped accordingly to allow the weight of the hook 202 at one or more ends to automatically cause rotation of the hook 202 upon being rotated passed a designated degree. Each hook 202 may be fixedly connected to a cross-wise mounting bar 206, which may pivot relative to the feeder housing 106, thereby rotating each hook 202 in between the locked and unlocked positions. The mounting bar 206 may connected to the bottom of the feeder housing 106 and may extend substantially across the width of the feeder housing 106. The mounting bar 206 may define a longitudinal axis that is perpendicular to the forward direction of travel of the combine 100. In an alternative embodiment, the mounting bar 206 may be split into two separate sections such that the hooks 202 may independently rotate from one another.

The at least one feeder connecting member 202 may be in the form of a pair of receiving pockets 204, such as left and right receiving pockets 204 that are located at the bottom of the header 110. Each receiving pocket 204 may include enclosure walls including a top wall 208 and a front wall 210, an opening 212, and a receiving bar 214. The top wall 208 of each receiving pocket 204 may be slopped at a downward angle such that each feeder hook 202 is moved downwardly, e.g. rotated clockwise as shown in FIG. 3, upon contacting the respective top wall 208 as the feeder housing 106 lifts the header 110. In other words, each top wall 208 acts as a mechanical stop which limits the motion of a respective hook 202. Thereby, the weight of the header 110 automatically causes the hooks 202 to rotate and engage with the receiving bars 214. Each receiving pocket 204 may have a respective receiving bar 214; or alternatively, a single receiving bar 214 may extend the width of the header 110 and the ends thereof may extend inside each receiving pocket 204. The receiving bar 214 may have any desired cross-sectional shape and may comprise any desired material.

In operation, the operator may automatically connect and secure the header 110 to the feeder housing 106 by initially aligning the feeder housing 106 with the header 110 and subsequently lifting the header 110 by way the feeder housing 106. As the feeder housing 106 lifts the header 110, the clearance between the top of each hook 202 and the top wall 208 of each receiving pocket 204 decreases such that each hook 202 will contact and be downwardly rotated by the top wall 208 of each receiving pocket 204. Hence, the shape of the hooks 202 and receiving pockets 204 and/or the weight of the header 110 automatically causes each hook 202 to rotate and lock with the receiving bar 214 of each receiving pocket 204 in order to secure the header 110 to the feeder housing 106. Thus, the operator does not have to leave the cab 104 of the agricultural vehicle 100 in order to connect the header 110. To disconnect the header 110, the operator may manually rotate the hooks 202 out of the receiving pockets 204. It should be appreciated that the operator may connect or disconnect any electrical and/or hydraulic lines between the header 110 and the feeder housing 106 as desired.

Figure 5:
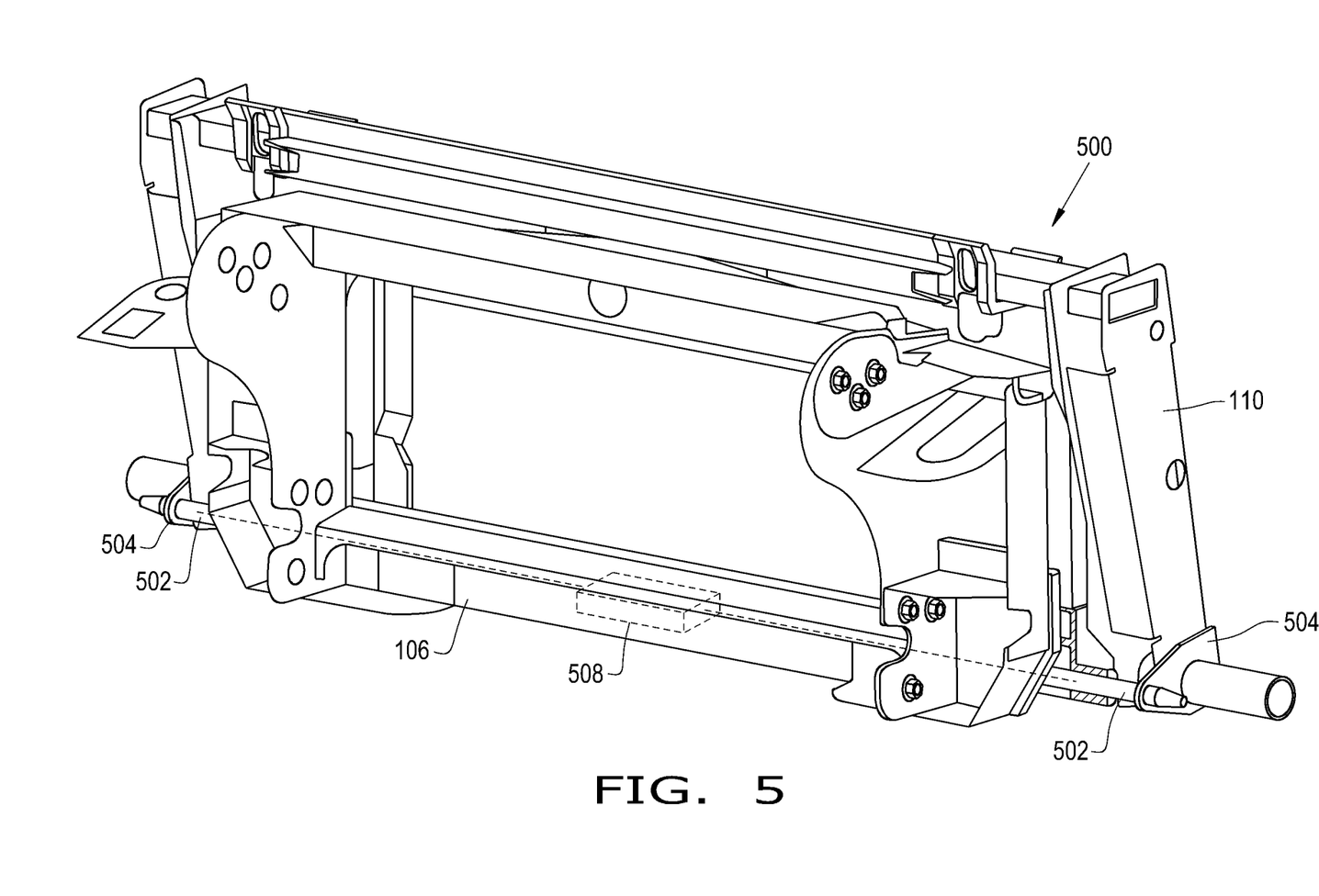
FIG. 5 illustrates a perspective view of another automatic latch system with locking pins, in an initial unlocked position, in accordance with another exemplary embodiment of the present invention.
Figure 6:
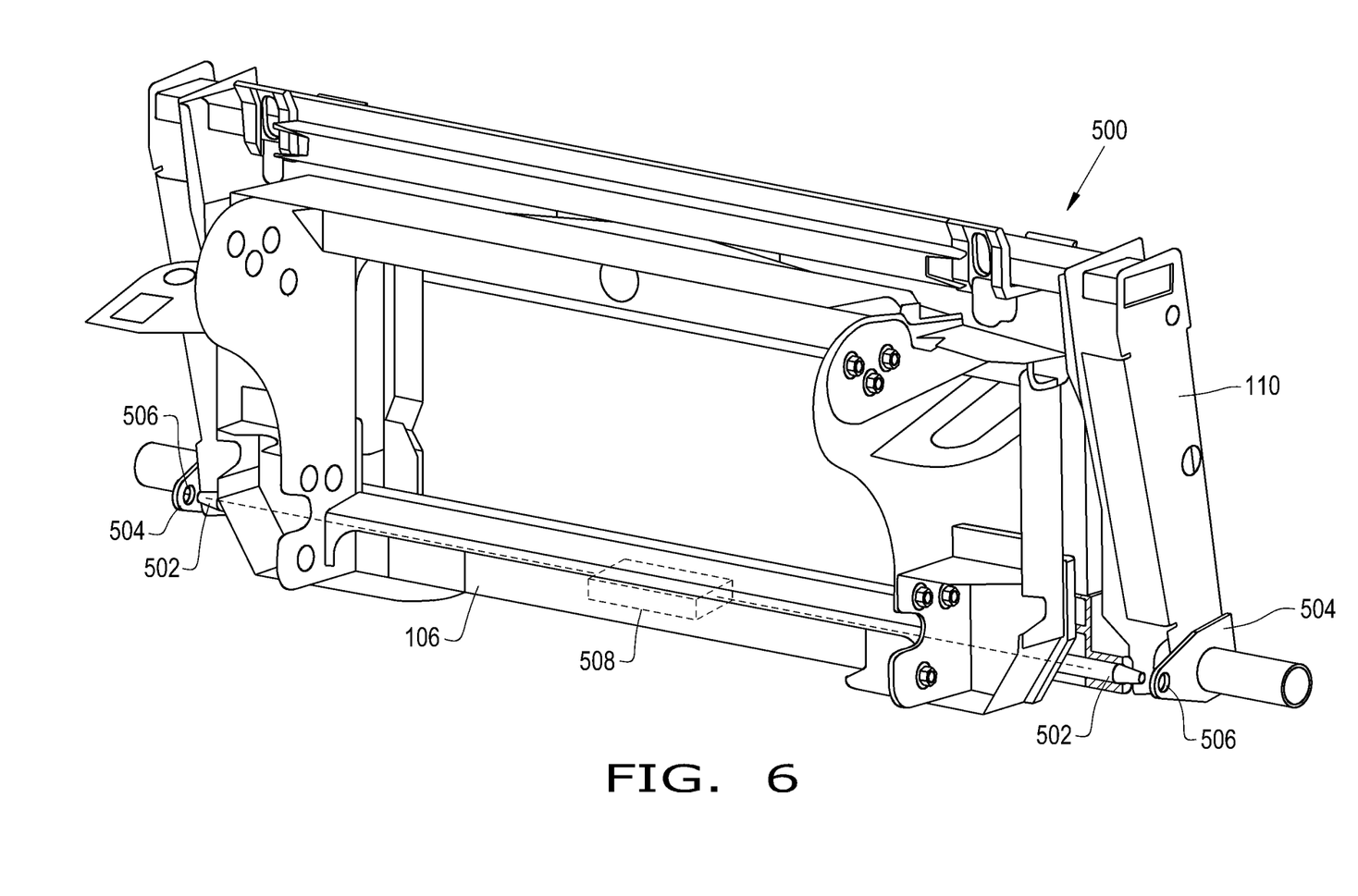
FIG. 6 illustrates a perspective view of the latch system of FIG. 5, in a locked position.
Figure 7:
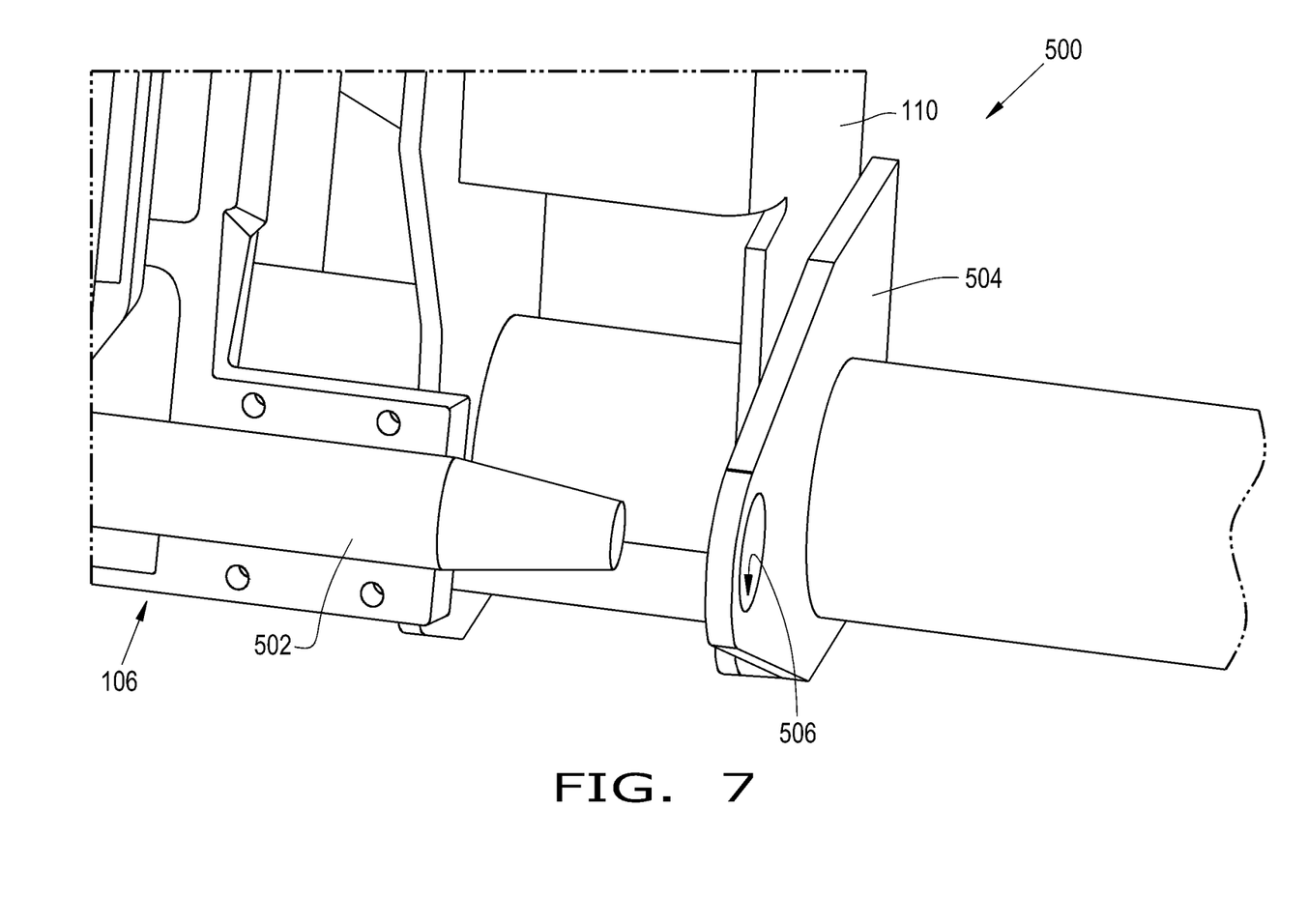
FIG. 7 illustrates a perspective view of a locking pin of the automatic latch system of FIGS. 5-6.

Referring now to FIGS. 5-7, there is shown another embodiment of an automatic attachment system 500 in the form of a pin-lock system 500 for automatically connecting and locking the header 110 to the feeder housing 106. The pin-lock system 500 generally includes at least one feeder connecting member 502, e.g. pins 502, located on and movably connected to the feeder housing 106, at least one header connecting member 504, e.g. a plate 504 and receiving hole 506, located on the header 110, and at least one actuator 508 for automatically extending and retracting the pins 502. Thereby, the automatic attachment system 500 may connect and lock the header 110 to the feeder housing 106 in a locked position (FIG. 5) or unlock and disconnect the header 110 in an unlocked position (FIG. 6).

The pins 502 may be movably connected to the feeder housing 106, for example within receiving bores or tracks in the feeder housing 106. The pins 502 may be elongated pins which extend throughout at least a portion of the lower frame member of the feeder housing 106. For instance, the pins 502 may respectively extend from the actuator 508 to the lateral ends of the feeder housing 106. Alternatively, the pins 502 may be in the form of shortened pins which only partially extend into the lower frame member of the feeder housing 106. The lateral ends of the pins 502 may be tapered. The pins 502 may comprise any desired shape and material, such as metal. It should be appreciated that the pins 502 may be vertically and/or horizontally oriented. Furthermore, it should be appreciated that the pins 502 may be spring-loaded. For instance, the pins 502 may be biased by a spring, or any other desired biasing member, so that upon being actuated, by the actuator 508 or operator, the pins 502 will forcibly lock with the plates 504 and receiving holes 506.

The plates 504 may be vertically oriented and mounted onto the header 110. The plates 504 may be separate components which are respectively attached to vertical frame members of the header 110. The plates 504 may extend rearwardly from the frame of the header 110. Each plate 504 may comprise any desired shape and material. Each receiving hole 506 may be located at the rearward end of the plate 504 (FIG. 7). The receiving holes 506 may have a shape and size which may correspond to the pins 502. Alternatively, the receiving holes 506 may be configured as slots which may not match the shape and size of the pins 502. It is conceivable to have the receiving holes 506 be located within any desired frame portion of the header 110.

The at least one actuator 508 may be connected to the pins 502 for sliding the pins 502 into and out of their extended and retracted, i.e., locked and unlocked, positions. The at least one actuator 508 may be in the form of an electric or hydraulic cylinder and/or motor. For example, the feeder housing 106 may include an electric motor and accompanying gearing for extending and retracting the pins 502. Alternatively, the feeder housing 106 may include two separate cylinders that are respectively attached to each pin 502.

The at least one actuator 508 may be operably connected to an electronic control unit of the agricultural vehicle such that the operator may input a command to actuate the at least one actuator 508 by way of the electronic control unit. The at least one actuator 508 may also be connected to one or more sensors located on the feeder housing 106 and/or header 110. In this regard, upon the sensor sensing that the header 110 is in contact with and being lifted by the feeder housing 106, the electronic control unit will automatically actuate the at least one actuator 508. It should be appreciated that the pin-lock system 500 may not include an actuator 508. Thereby, the operator may manually actuate the pins 502 to lock or unlock the header 110.

Figure 8:
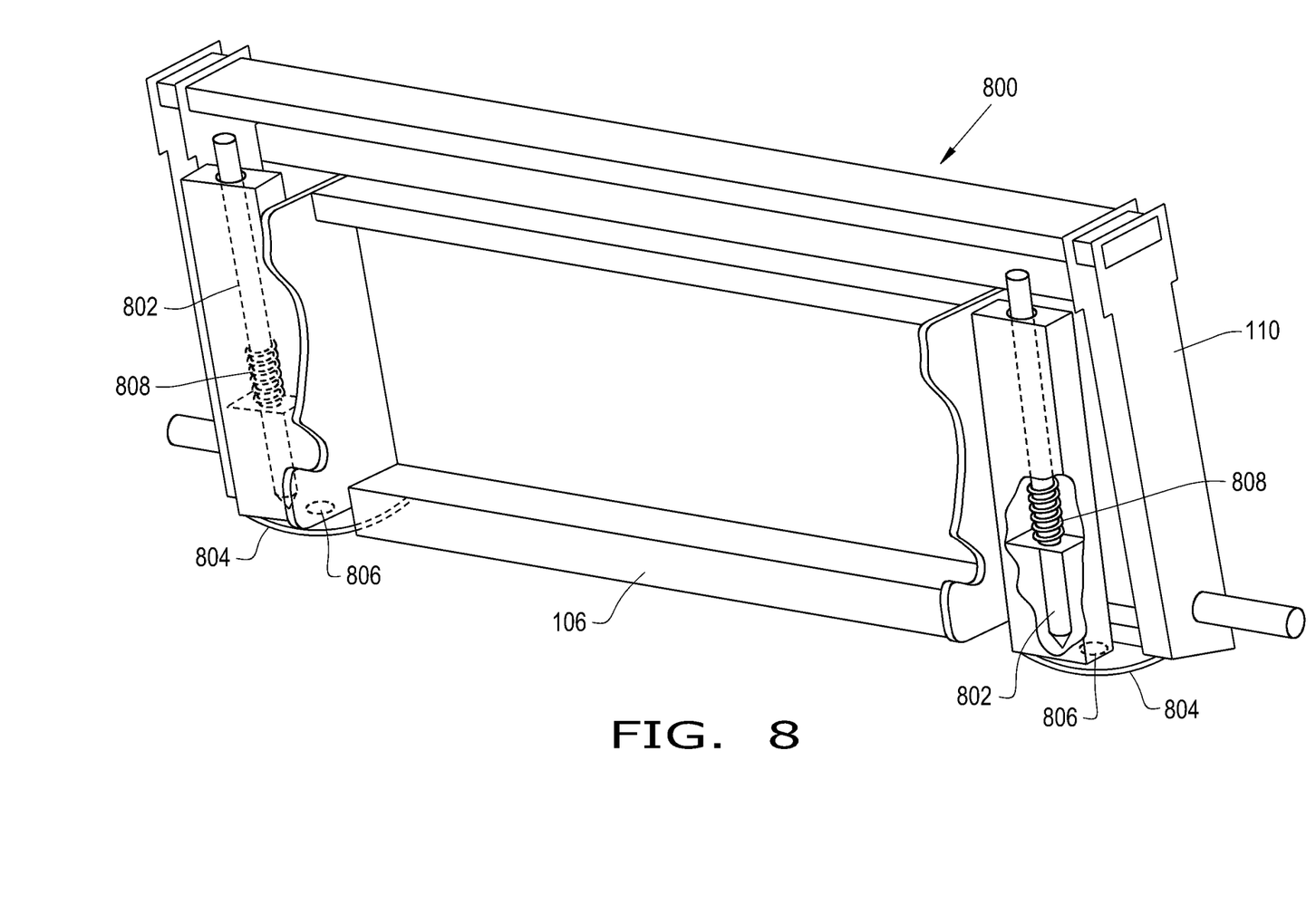
FIG. 8 illustrates a perspective view of another automatic latch system with vertical locking pins, in an initial position before the feeder housing picks up the header, in accordance with an exemplary embodiment of the present invention.

Referring now to FIG. 8, there is shown another embodiment of an automatic attachment system 800 in the form of a pin-lock system 800 for automatically connecting and locking the header 110 to the feeder housing 106. The pin-lock system 800 generally includes at least one feeder connecting member 802 located on and movably connected to the feeder housing 106 and at least one header connecting member 804, e.g. a plate 804 and receiving hole 806, located on the header 110. The shape of the feeder connecting members 802 and/or the weight of the header 110 may automatically cause the feeder connecting members 802 to engage and lock with the header connecting members 804 as the header 110 is being lifted by the feeder housing 106. Thereby, the automatic attachment system 800 may connect and lock or disconnect and unlock the header 110 and the feeder housing 106.

The pins 802 may be vertically disposed within the one or more vertical support beams of the feeder housing 106. The pins 802 may vertically slide within the feeder housing 106. The pins 802 may be biased in the unlocked position by a biasing member 808, for example a coil spring 808. In the unlocked position, i.e., before picking up the header 110, the pins 802 may extend at least partially above the top support beam of the feeder housing 106. In the locked position, i.e., after picking up the header 110, the pins may at least partially extend below the lower support beam of the feeder housing 106 and within the receiving holes 806 of the plates 804 mounted onto the header 110. As the feeder housing 106 lifts the header 110, the pins 802 will contact the header 110 and will move downwardly due to the weight of the header acting on the pins 802 and overcoming the biasing force of the springs 808. As the feeder housing 106 lowers the header 110, in order to disconnect to the header 110, the weight of the header 110 may be transferred onto the ground and the pins 802 may upwardly slide and disengage with the receiving holes 806 of the plates 804. The pins 802 may comprise any desired shape and material, such as metal.

The plates 804 may be horizontally oriented and mounted to an underside of the frame of the header 110. The plates 804 may extend rearwardly from the frame of the header 110. The plates 804 may comprise any desired shape and material. The receiving holes 806 may comprise any desired shape. Furthermore, the top support member of the header 110 may or may not have receiving slots for contacting the pins 802.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An attachment system for an agricultural vehicle including a feeder housing and a header, comprising:
    at least one feeder connecting member configured for being located on and movably connected to the feeder housing; and
    at least one header connecting member configured for being located on the header, and the at least one feeder connecting member is automatically connectable and securable to the at least one header connecting member as the feeder housing lifts the header, wherein the at least one feeder connecting member is in the form of at least one hook pivotable relative to the feeder housing and facing downward, and wherein the at least one header connecting member is in the form of at least one receiving pocket including a top wall, a front wall, an opening, and a receiving bar, and the top wall of the at least one receiving pocket is slopped at a downward angle such that the at least one feeder connecting member is moved downwardly upon contacting the top wall such that the at least one feeder connecting member automatically engages with the receiving bar as the feeder housing lifts the header.

2. The attachment system of claim 1, wherein at least one of a shape of the at least one header connecting member and a weight of the header automatically causes the at least one feeder connecting member to lock with the at least one header connecting member for securing the header to the feeder housing.

3. The attachment system of claim 1, further comprising a cross-wise mounting bar configured for rotatably connecting to the feeder housing, and the at least one feeder connecting member is connected to the mounting bar.

4. An agricultural vehicle, comprising:
    a chassis;
    a feeder housing connected to the chassis;
    a header removably connected to the feeder housing; and
    an attachment system for automatically attaching and securing the header to the feeder housing as the header is lifted by the feeder housing, the attachment system comprising:
        at least one feeder connecting member located on and movably connected to the feeder housing; and
        at least one header connecting member located on the header, and the at least one feeder connecting member is automatically connectable and securable to the at least one header connecting member as the feeder housing lifts the header, wherein the at least one feeder connecting member is in the form of at least one hook pivotable relative to the feeder housing and facing downward, and the at least one header connecting member is in the form of at least one receiving pocket acting on the feeder connecting member as the feeder housing lifts the header connecting member.

5. The agricultural vehicle of claim 4, wherein at least one of a shape of the at least one header connecting member and a weight of the header automatically causes the at least one feeder connecting member to lock with the at least one header connecting member for securing the header to the feeder housing.

6. The agricultural vehicle of claim 4 further comprising a cross-wise mounting bar rotatably connected to the feeder housing, and the at least one feeder connecting member is connected to the mounting bar.

7. The agricultural vehicle of claim 4, wherein the at least one receiving pocket includes a top wall, a front wall, an opening, and a receiving bar, and the top wall of the at least one receiving pocket is slopped at a downward angle such that the at least one feeder connecting member is moved downwardly upon contacting the top wall such that the at least one feeder connecting member automatically engages with the receiving bar as the feeder housing lifts the header.

8. A method for attaching a header to a feeder housing of an agricultural vehicle, comprising:
    providing an attachment system for the agricultural vehicle, the attachment system comprises at least one feeder connecting member configured in the shape of at least one downwardly facing hook for being located on and pivotally connected to the feeder housing, and at least one header connecting member configured for being located on the header in the form of a receiving pocket having a top wall sloped at a downward angle and
    lifting the header, by the feeder housing, for automatically connecting and securing the at least one feeder connecting member in the form of the hook to the at least one header connecting member as the feeder housing lifts the header, wherein at least one of a shape of the upper wall of the at least one header connecting member and a weight of the header automatically causes the at least one feeder connecting member in the form of the hook to lock with the at least one header connecting member for securing the header to the feeder housing.

\* \* \* \* \*